United States Patent
She et al.

(10) Patent No.: US 7,920,640 B2
(45) Date of Patent: Apr. 5, 2011

(54) TRANSMISSION METHOD AND TRANSMISSION APPARATUS USED IN MULTIANTENNA WIRELESS COMMUNICATION SYSTEM

(75) Inventors: Xiaoming She, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 817 days.

(21) Appl. No.: 11/908,556

(22) PCT Filed: Mar. 15, 2006

(86) PCT No.: PCT/JP2006/305173
§ 371 (c)(1),
(2), (4) Date: Sep. 13, 2007

(87) PCT Pub. No.: WO2006/098387
PCT Pub. Date: Sep. 21, 2006

(65) Prior Publication Data
US 2009/0052560 A1      Feb. 26, 2009

(30) Foreign Application Priority Data

Mar. 16, 2005   (CN) .......................... 2005 1 0056304

(51) Int. Cl.
*H04L 27/28*   (2006.01)
(52) U.S. Cl. ....................................... 375/267; 375/360
(58) Field of Classification Search .................. 375/267, 375/260, 299; 370/437, 465, 334; 455/101, 455/102, 69
See application file for complete search history.

(56) References Cited

U.S. PATENT DOCUMENTS
2003/0108117 A1    6/2003  Ketchum et al.
(Continued)

FOREIGN PATENT DOCUMENTS
CN          1496025          5/2004
(Continued)

OTHER PUBLICATIONS

Zhenping Hu, Guangxi Zhu, Yuan Xia, Gan Liu, "Multiuser subcarrier and bit allocation for MIMO-OFDM systems with perfect and partial channel information", Department of Electronics& Information Engineering, Huazhong University of Science & Technology, Wuhan, P.R.China, 2004 IEEE.*

(Continued)

*Primary Examiner* — Chieh M Fan
*Assistant Examiner* — Aristocratis Fotakis
(74) *Attorney, Agent, or Firm* — Dickinson Wright PLLC (57) ABSTRACT

A transmission bit and transmission power distributing method that can reduce the arithmetic amount in a multiantenna-input/multiantenna-output (MIMO) wireless communication system. This method comprises steps of calculating a signal-to-interference-noise ratio (SINR) gain after MIMO detection of each of transport substreams (S601, S602); optimizing, based on the acquired SINR gain, a transmission bit and transmission power distribution in the space domain for all transport substreams on a particular subcarrier in the frequency domain, thereby deciding a transmission bit and transmission power distribution parameters (S603, S604); and optimizing a transmission bit and transmission power distribution for adjacent subcarriers, by sequentially using the transmission bit and transmission power distribution parameters distributed on the subcarrier for which the transmission bit and transmission power distribution parameters have been decided (S605 to S610).

13 Claims, 6 Drawing Sheets

U.S. PATENT DOCUMENTS

| | | |
|---|---|---|
| 2003/0235255 A1 | 12/2003 | Ketchum et al. |
| 2004/0042558 A1 | 3/2004 | Hwang et al. |
| 2004/0141566 A1* | 7/2004 | Kim et al. .................. 375/267 |
| 2005/0018597 A1 | 1/2005 | Yuda et al. |
| 2005/0047517 A1* | 3/2005 | Georgios et al. ............. 375/267 |
| 2005/0180354 A1* | 8/2005 | Cho et al. .................. 370/328 |
| 2006/0114836 A1* | 6/2006 | Pollin et al. ................ 370/252 |
| 2006/0193294 A1 | 8/2006 | Jorswieck et al. |

FOREIGN PATENT DOCUMENTS

| | | |
|---|---|---|
| JP | 2002261727 | 9/2002 |
| JP | 2004072150 | 3/2004 |
| WO | 03050968 | 6/2003 |
| WO | 2004047354 | 6/2004 |
| WO | 2004002047 | 12/2004 |

OTHER PUBLICATIONS

Shenghui song, Chunping Hou, Dazhong Cao, "Bit Allocation Algorithm for Multi-User Adadptive OFDM System With Adaptive Trellis Coded MQAM", School of Electronic Information Engineering, Tianjin University, 2002 IEEE.*

Pengfei Xia, Shengli Zhou, and Georgios B. Giannakis, "MIMO OFDM with ST Coding and Beamforming Adapted to Partial CSI", University of Minnesota, Mar. 2003.*

Didem Kivanc and Hui Liu, "Subcarrier allocation and power control for OFDMA", Washington University, Seattle, IEEE 2000.*

PCT International Search Report dated Jun. 7, 2006.

* cited by examiner

TRANSMISSION METHOD AND TRANSMISSION APPARATUS USED IN MULTIANTENNA WIRELESS COMMUNICATION SYSTEM

TECHNICAL FIELD

The present invention relates to an adaptive transmission method and a transmitting apparatus in a radio communication system. More particularly, the present invention relates to a transmission method and a transmitting apparatus which is used for a multi-antenna radio communication system and capable of reducing an amount of calculation in processing.

BACKGROUND ART

A radio communication system is increasingly integrated with the Internet, and there is a growing demand from users for variety and quality of radio communication services. For this reason, new-generation radio communication systems in response to demands for radio multimedia and high-speed transmission are actively developed. In such a trend, a MIMO-OFDM technique which combines multi-antenna input/multi-antenna output (MIMO) and orthogonal frequency division multiplexing (OFDM) increasingly attracts public attention.

In a MIMO system, the transmitting side transmits signals using a plurality of transmitting antennas and the receiving side receives signals using a plurality of receiving antennas. Compared to a conventional single antenna transmission method, the MIMO technique can significantly improve a channel capacity and improve an information transmission rate. In the MIMO system, when the number of used transmitting antennas and receiving antennas is larger, the information transmission rate becomes higher. Antenna resources in the spatial domain can be used almost infinitely compared to resources in the time domain, so that the MIMO technique overcomes the bottleneck in shortage of the resources in conventional techniques, and is one of core techniques of a next-generation radio communication system.

Furthermore, the OFDM technique is currently one of the mainstream techniques for realizing a high-speed radio data transmission. In the principle of the OFDM techniques, high-speed data to be transmitted is transmitted using a plurality of orthogonal subcarriers, and therefore the transmission rate on each subcarrier becomes relatively low. The subcarrier orthogonal multiplexing technique of OFDM can further improve spectrum efficiency of the system compared to a normal frequency multiplexing system. In a system using an OFDM technique, the frequency band of an overall signal is divided into a plurality of very narrow subcarrier frequency bands, and therefore flat fading occurs. Therefore, compared to a single carrier system, the OFDM system can realize a balance more readily.

Furthermore, an adaptive transmission technique makes it possible to effectively improve the information transmission rate on an attenuated channel. An adaptive modulation and coding (AMC) technique is one of important adaptive transmission techniques. Its basic concept includes adaptively changing modulation parameters, coding parameters and transmission power used for transmission based on channel characteristics. System performance is improved by transmitting more information when the channel condition is good and transmitting less information when the channel condition is poor. Therefore, according to the adaptive transmission technique, it is possible to realize a higher information transmission rate, lower bit error rate (BER) and lower transmission power.

Therefore, compared to simply using one technique where the above two techniques of MIMO-OFDM and AMC are combined, higher system performance may be obtained. Hereinafter, a radio communication system applying the two techniques of MIMO-OFDM and AMC will be referred to as a "MIMO-OFDM-AMC system."

DISCLOSURE OF INVENTION

However, when the two techniques of MIMO-OFDM and AMC are combined, the number of data substreams comprised of a plurality of subcarriers in the frequency domain corresponding to transmitting antennas in the spatial domain substantially increases. For example, when the number of subcarriers is $N_c$ and the number of transmitting antennas is $n_T$, the number of data substreams is $N_c \times n_T$. Therefore, in the MIMO-OFDM-AMC system, the amount of calculation in processing of determining adaptive transmission parameters (transmission bits and transmission power distribution parameters) for every above $N_c \times n_T$ data substreams become enormous. Therefore, it is difficult to realize the MIMO-OFDM-AMC system.

It is therefore an object of the present invention to provide, in a MIMO-OFDM-AMC system, a transmission method and a transmitting apparatus that optimize distribution of transmission bits and transmission power for data substreams with a low amount of calculation in processing.

The transmission method according to the present invention is a transmission method used for a multi-antenna radio communication system includes: a signal-to-interference and noise ratio gain calculating step of detecting data substreams and calculating a signal-to-interference and noise ratio gain for each data substream; a spatial domain distribution step of optimizing distribution of transmission bits and transmission power in a spatial domain for all data substreams on a given subcarrier in a frequency domain based on the obtained signal-to-interference and noise ratio gain, and determining transmission bit and transmission power distribution parameters; and an adjacent subcarrier distribution step of optimizing distribution of transmission bits and transmission power for an adjacent subcarrier by sequentially using the transmission bit and transmission power distribution parameters distributed on the given subcarrier for which the transmission bit and transmission power distribution parameters are determined.

The transmitting apparatus of the present invention is a transmitting apparatus used for a multi-antenna radio communication system includes: a signal-to-interference and noise ratio gain calculating section that detects data substreams adaptively transmitted, using channel estimation matrix H, and calculates a signal-to-interference and noise ratio gain for each data substream; a transmission bit and transmission power distribution optimizing section that optimizes distribution of transmission bits and transmission power in a spatial domain for all data substreams on a given subcarrier in a frequency domain based on the obtained signal-to-interference and noise ratio gain, and determines transmission bit and transmission power distribution parameters; and an adjacent subcarrier transmission bit and transmission power optimizing section that optimizes distribution of transmission bits and transmission power for a subcarrier adjacent to the given subcarrier for which the transmission bit and transmission power distribution parameters are determined, by sequentially using the transmission bit and transmission power distribution parameters distributed on the given subcarrier.

According to the transmission method and the transmitting apparatus of the present invention, transmission bits and transmission power are distributed in the spatial domain, and the number of dimensions used for distribution of transmission bits and transmission power is reduced, so that it is possible to reduce the amount of calculation in processing compared to conventional methods. Further, it is possible to simplify an algorithm of distributing transmission bits and transmission power by using correlation between channel characteristics of adjacent subcarriers.

BEST MODE FOR CARRYING OUT THE INVENTION

Hereinafter, an embodiment of the present invention will be described in detail with reference to the attached drawings.

Figure 1:
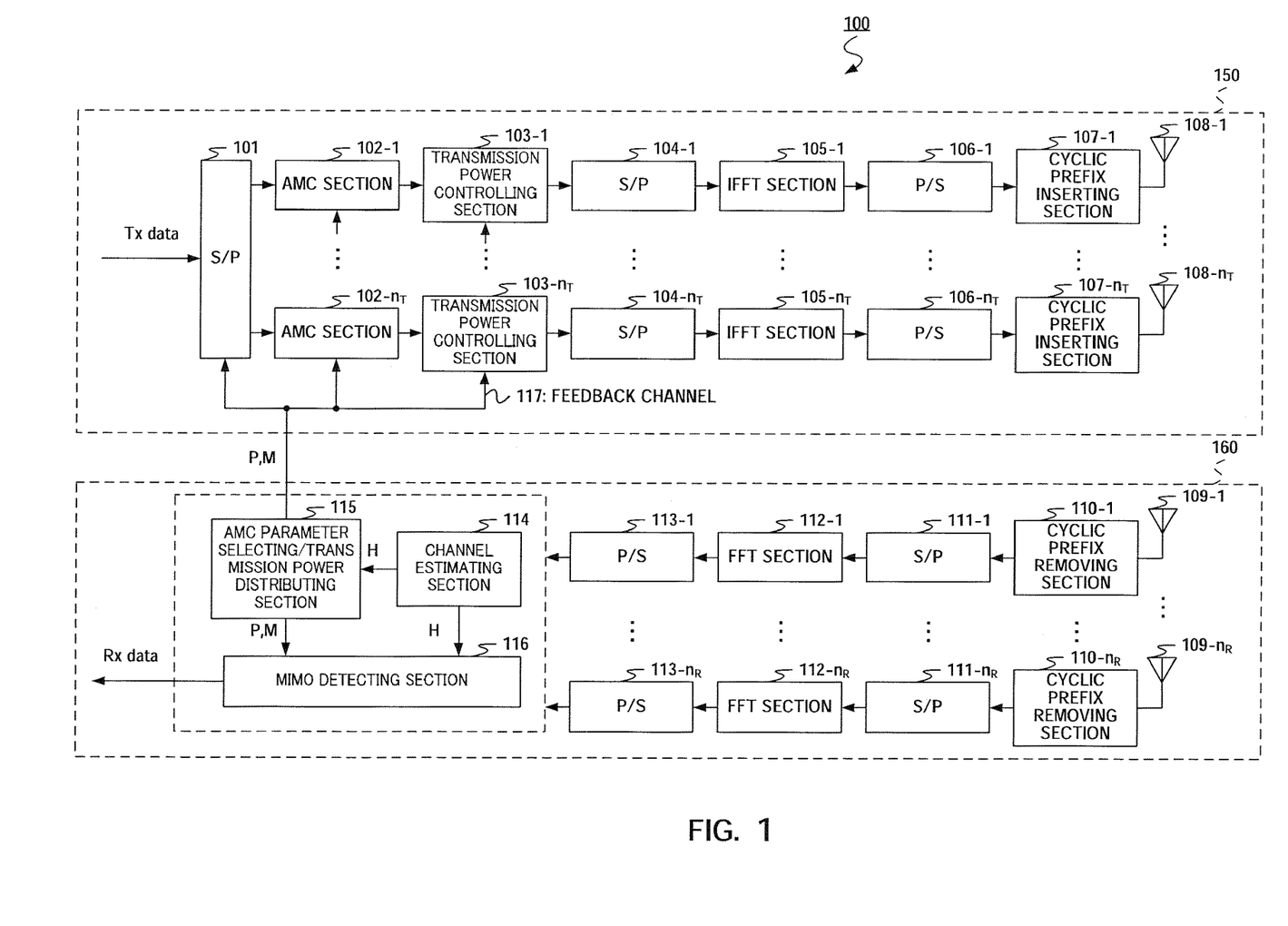
FIG. 1 is a block diagram showing the configuration of a MIMO-OFDM system (MIMO-OFDM-AMC system) using an AMC technique according to an embodiment of the present invention.

FIG. 1 is a block diagram showing the configuration of MIMO-OFDM (MIMO-OFDM-AMC) system 100 using an AMC technique according to an embodiment of the present invention.

In FIG. 1, MIMO-OFDM-AMC system 100 has radio transmitting apparatus 150 that carries out transmission using $n_T$ transmitting antennas and radio receiving apparatus 160 that carries out reception using $n_R$ receiving antennas. Radio transmitting apparatus 150 has serial-to-parallel (S/P) converting section 101, adaptive modulation coding (AMC) sections 102-1 to 102-$n_T$, transmission power controlling sections 103-1 to 103-$n_T$, serial-to-parallel (S/P) converting sections 104-1 to 104-$n_T$, inverse fast Fourier transforming (IFFT) sections 105-1 to 105-$n_T$, parallel-to-serial (P/S) converting sections 106-1 to 106-$n_T$, cyclic prefix (CP) inserting sections 107-1 to 107-$n_T$ and transmitting antennas 108-1 to 108-$n_T$. Radio receiving apparatus 160 has receiving antennas 109-1 to 109-$n_R$, cyclic prefix (CP) removing sections 110-1 to 110-$n_R$, serial-to-parallel (S/P) converting sections 111-1 to 111-$n_R$, fast Fourier transforming (FFT) sections 112-1 to 112-$n_R$, parallel-to-serial (P/S) converting sections 113-1 to 113-$n_R$, channel estimating section 114, AMC parameter selecting/transmission power distributing section 115 and MIMO detecting section 116. A plurality of the same components indicated using the same sub-numbers may be referred to by omitting the sub-numbers hereinafter. For example, adaptive modulation coding (AMC) sections 102-1 to 102-$n_T$ may be referred to as "adaptive modulation coding (AMC) section 102."

In radio transmitting apparatus 150, serial-to-parallel (S/P) converting section 101 divides frequency domain data Tx Data to be transmitted into $n_T$ data substreams, and outputs the data substreams to AMC sections 102. Data substreams each correspond to transmitting antennas 108, respectively. Adaptive modulation coding sections 102 carry out adaptive modulation coding on the data substreams inputted from serial-to-parallel (S/P) converting section 101 based on channel transmission characteristics, and outputs the data substreams to transmission power controlling sections 103. Transmission power controlling sections 103 carry out transmission power control on the data substreams subjected to adaptive modulation coding, and outputs the data substreams to serial-to-parallel (S/P) converting sections 104. Next, serial-to-parallel (S/P) converting section 104, inverse fast Fourier transforming (IFFT) section 105 and parallel-to-serial (P/S) converting section 106 convert the frequency domain data substreams outputted by transmission power controlling section 103 to time domain signals. Next, cyclic prefix (CP) inserting sections 107 carry out processing of inserting cyclic prefixes to the time domain signals inputted from parallel-to-serial (P/S) converting sections 106. The time domain signals after cyclic prefix insertion are transmitted from corresponding transmitting antennas 108.

In radio transmitting apparatus 150, adaptive transmission parameters necessary to carry out an AMC operation and a transmission power control operation on the data substreams, for example, adaptive modulation coding (AMC) parameter M and transmission power distribution parameter P, are determined by radio receiving apparatus 160 and fed back through feedback channel 117. Radio transmitting apparatus 150 controls the length of data substreams outputted from serial-to-parallel (S/P) converting section 101 based on AMC parameter M fed back from radio receiving apparatus 160.

In radio receiving apparatus 160, $n_R$ receiving antennas 109 each receive spatial multiplex signals, first. Next, cyclic prefix (CP) removing section 110 carries out processing of removing CPs from the signals received by receiving antennas 109. Next, serial-to-parallel (S/P) converting section 111, fast Fourier transforming (FFT) section 112 and parallel-to-serial (P/S) converting section 113 further convert the time domain signals inputted from cyclic prefix (CP) removing section 110 to frequency domain signals. Next, channel estimating section 114 carries out channel estimation based on a pilot signal out of the frequency domain signals inputted from parallel-to-serial (P/S) converting section 113 or using other methods, and obtains channel estimation (transfer function) matrix H. Next, AMC parameter selecting/transmission power distributing section 115 determines AMC parameter M and transmission power distribution parameter P for data substreams used for adaptive transmission by radio transmitting apparatus 150 based on channel estimation matrix H, and feeds the result back to radio transmitting apparatus 150 using feedback channel 117. Next, MIMO detecting section 116 detects the data substreams transmitted by radio transmitting apparatus 150 based on channel estimation matrix H, and adaptive modulation coding parameter M and transmission power distribution parameter P for data substreams inputted from the AMC parameter selecting/transmission power distributing section 115 and obtains original transmission data as received data (Rx Data).

There are many MIMO detection methods used for MIMO detecting section 116 such as a generally used ZF (Zero Forcing) method, MMSE (Minimum Mean Square Error) or other methods. MIMO detecting section 116 first separates the signals transmitted by transmitting antennas 108 of radio transmitting apparatus 150 using the above detection method and carries out demodulation and decoding on the obtained signals. In actual MIMO detection, the two operations of separation, and demodulation and decoding of the signals transmitted through transmitting antennas 108 are less likely to be carried out independently. It is likely that the output of the separation is used for the demodulation and decoding, and also the processing of the separation often needs the output of the demodulation and decoding.

Next, distribution of transmission bits and distribution of transmission power in MIMO-OFDM-AMC system 100 of the above configuration will be described. Distribution of the transmission bits is equivalent to selection of AMC parameter M (the number of transmission bits is in a one-to-one correspondence with an AMC parameter and both may be assumed to be equivalent), and a transmission bit distribution parameter will be referred to as "M".

Figure 2:
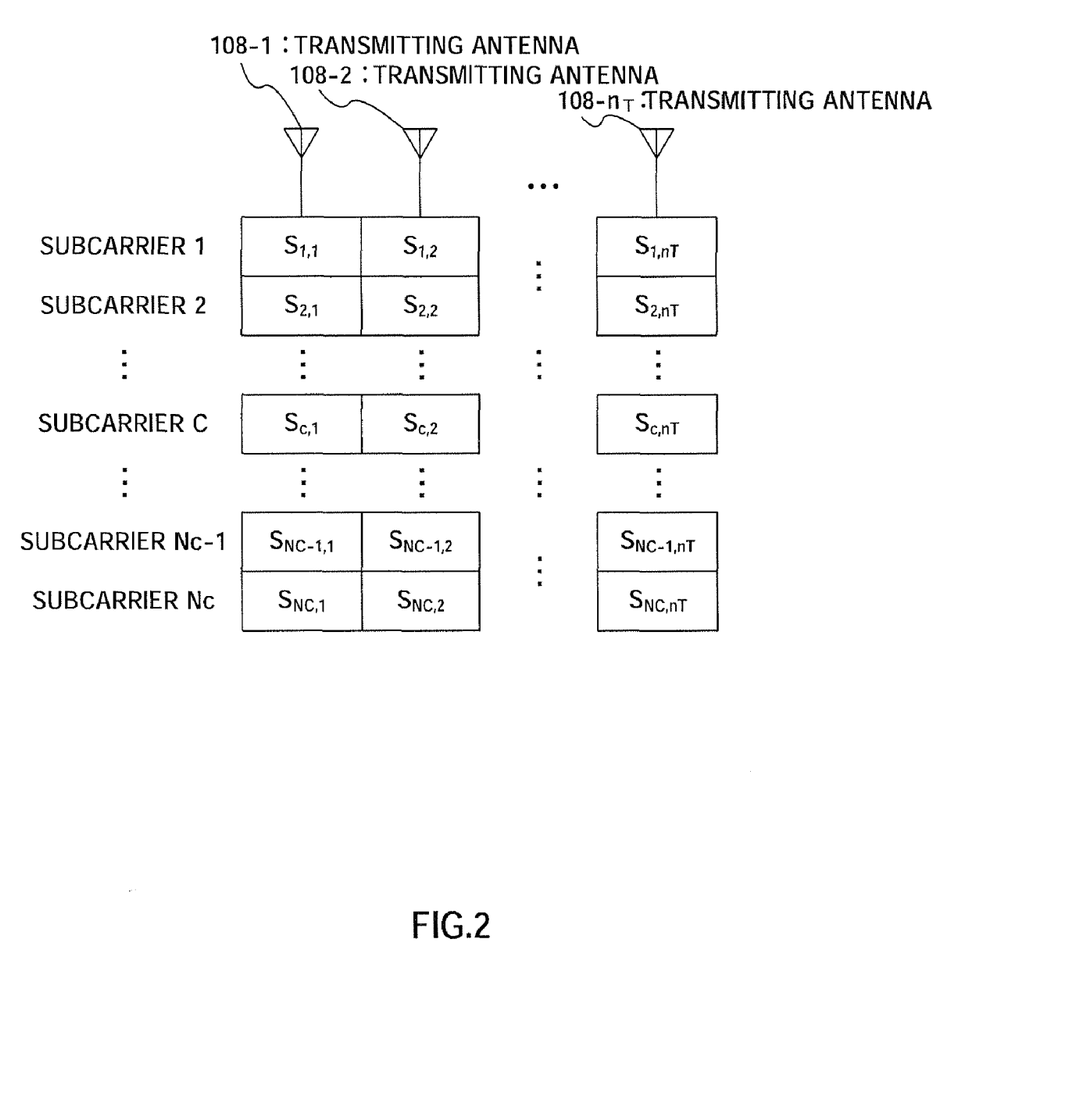
FIG. 2 illustrates a concept of adaptive transmission in the MIMO-OFDM-AMC system.

FIG. 2 illustrates the concept of adaptive transmission in MIMO-OFDM-AMC system 100 according to this embodiment.

In FIG. 2, subcarriers 1 to N, show the concept in the frequency domain, and transmitting antennas 108-1 to 108-$n_T$ show the concept in the spatial domain. This figure shows one adaptive transmission unit as a whole. In FIG. 2, $s_{c,j}$ (c=1, 2, ..., $N_c$, j=1, 2, ..., $n_T$) expresses a data substream (or adaptive transmitting section) for which a c-th subcarrier signal of MIMO-OFDM-AMC system 100 is transmitted through j-th transmitting antenna 108-j. In FIG. 2, distribution of transmission bits and transmission power carried out on each data substream is actually equivalent to selection of an AMC parameter and distribution of transmission power carried out on each data substream.

In MIMO-OFDM-AMC system 100, channel estimation (transfer function) matrix H is a three-dimensional matrix and can be expressed by a plurality of sets of two-dimensional matrices. To be more specific, $H^c$ (c=1, 2, ..., Nc) in channel estimation matrix H={$H^1$, $H^2$, ..., $H^{Nc}$} is a matrix of $n_R \times n_T$ and expresses a channel estimation matrix on a c-th subcarrier of MIMO-OFDM-AMC system 100. Element $H^c(i, j)$ on an i-th row and a j-th column of $H^c$ expresses a frequency domain channel gain when a c-th subcarrier signal of MIMO-OFDM-AMC system 100 is transmitted through j-th transmitting antenna 108 and received at i-th receiving antenna 109. Here, i=1, 2, ..., $n_R$ and j=1, 2, ..., $n_T$.

Figure 3:
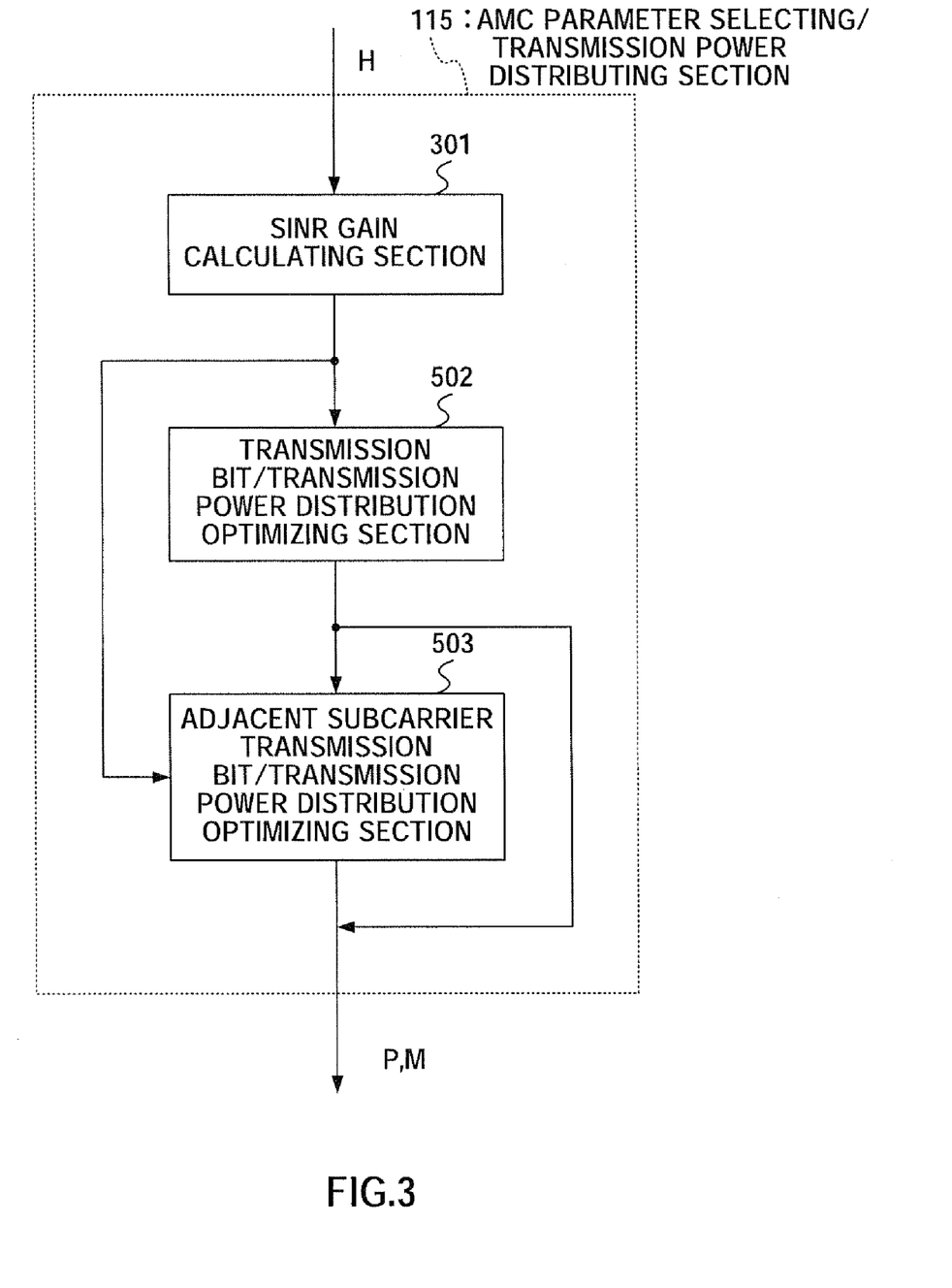
FIG. 3 is a block diagram showing the detailed configuration of an adaptive modulation coding (AMC) parameter selecting/transmission power distributing section according to the embodiment of the present invention.

FIG. 3 is a block diagram showing the detailed configuration of AMC parameter selecting/transmission power distributing section 115 according to this embodiment.

In FIG. 3, AMC parameter selecting/transmission power distributing section 115 has signal-to-interference and noise ratio (SINR) gain calculating section 301, transmission bit/transmission power distribution optimizing section 502 and adjacent subcarrier transmission bit/transmission power distribution optimizing section 503.

Signal-to-interference and noise ratio (SINR) gain calculating section 301 uses channel estimation matrix H obtained at channel estimating section 114, and calculates signal-to-interference and noise ratio (SINR) gain $G_{c,j}$ after MIMO detection of data substreams $s_{c,j}$ in MIMO-OFDM-AMC system 100. Here, c=1, 2, ..., $N_c$ and j=1, 2, ..., $n_T$.

Next, transmission bit/transmission power distribution optimizing section 502 optimizes distribution of transmission bits and transmission power in the spatial domain for all data substreams on one subcarrier in the frequency domain. Here, transmission bit/transmission power distribution optimizing section 502 uses an algorithm, for example, Greedy algorithm, of optimizing distribution of arbitrary transmission bits and transmission power, used for conventional adaptive transmission. Transmission bit/transmission power distribution optimizing section 502 optimizes the adaptive transmission parameters (transmission bit distribution parameter and transmission power distribution parameter) on $n_T$ data substreams on only one subcarrier in the frequency domain. The range of optimization is limited to the spatial domain.

Next, adjacent subcarrier transmission bit/transmission power distribution optimizing section 503 sequentially uses adaptive transmission parameter information distributed on the subcarrier on which adaptive transmission parameters (transmission bit and transmission power distribution parameters) are distributed by transmission bit/transmission power distribution optimizing section 502, and optimizes distribution of transmission bits and transmission power on the adjacent subcarrier. In MIMO-OFDM-AMC system 100, the channel characteristics on subcarriers having adjacent frequencies are very similar, and therefore adaptive transmission parameters which are actually distributed on the adjacent subcarrier must also be very similar. That is, in distribution of adaptive transmission parameters, when distribution of transmission bits and transmission power on one subcarrier is optimized, it is possible to obtain adaptive transmission parameters M and P of the adjacent subcarrier by only carrying out fine adjustment of the results of optimizing the subcarrier distribution. Adjacent subcarrier transmission bit/transmission power distribution optimizing section 503 can determine the adaptive transmission parameters of all subcarriers in the frequency domain by only adjusting the adaptive transmission parameters of one subcarrier obtained at transmission bit/transmission power distribution optimizing section 502. Compared to carrying out distribution of transmission bits and transmission power on subcarriers redundantly, it is possible to substantially reduce the amount of calculation in processing of adaptive transmission using such a method.

Figure 4:
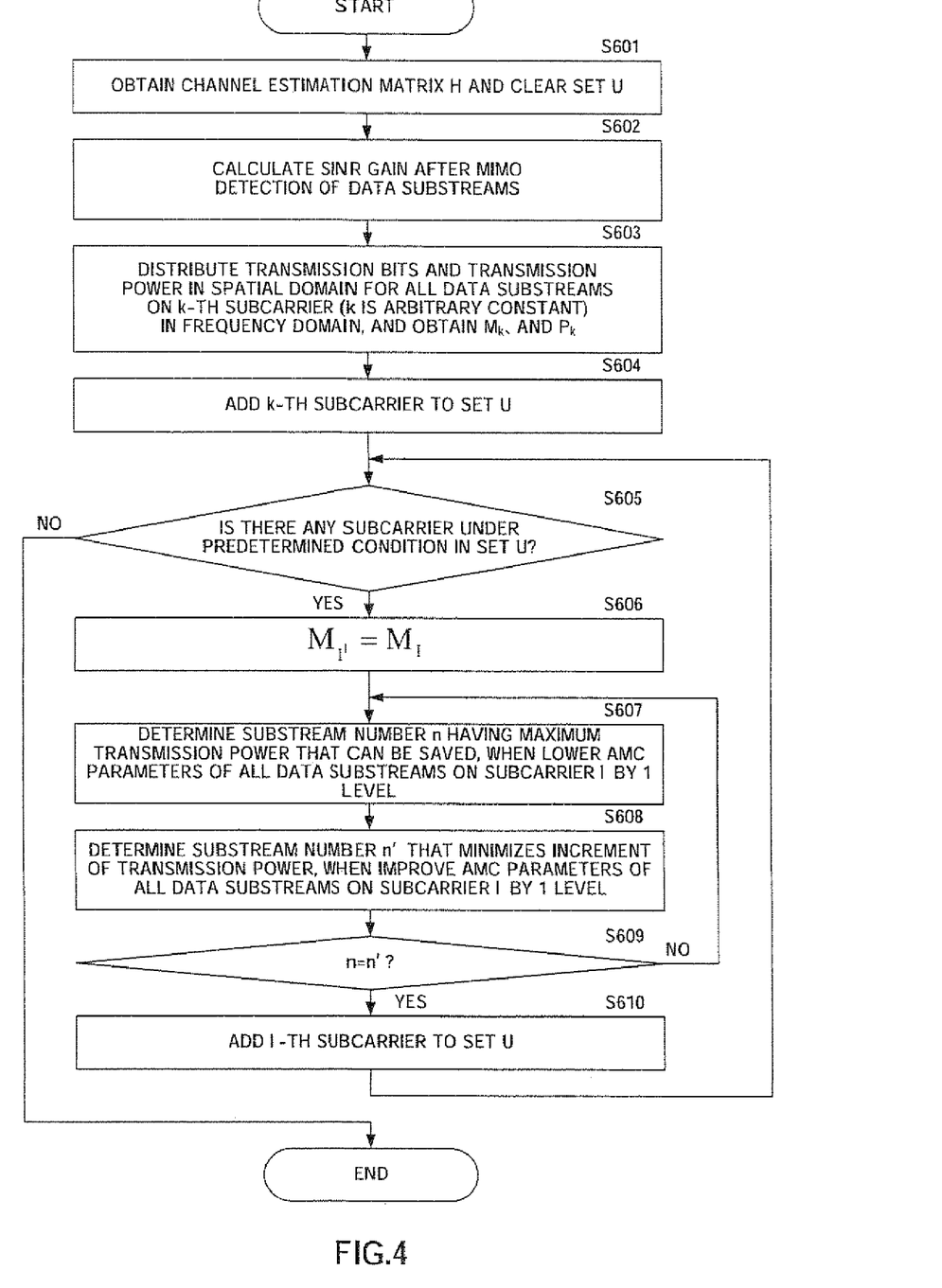
FIG. 4 is a flowchart showing steps of a transmission bit/transmission power distribution method according to the embodiment of the present invention.

FIG. 4 is a flowchart showing steps of the method of distributing transmission bits and transmission power in MIMO-OFDM-AMC system 100 according to this embodiment.

First, in step S601, channel estimating section 114 carries out channel estimation and obtains channel estimation (transfer function) matrix H={$H^1$, $H^2$, ..., $H^{Nc}$}. Here, $H^c$ (c=1, 2, ..., Nc) is a channel estimation (transfer function) matrix on the c-th subcarrier in MIMO-OFDM-AMC system 100. Furthermore, in step S601, SINR gain calculating section 301 clears set U comprised of the subcarriers on which transmission bits and transmission power are distributed.

Next, in step S602, SINR gain calculating section 301 calculates SINR gain $G_{c,j}$ after MIMO detection of data substreams $s_{c,j}$ based on channel estimation matrix H and the MIMO detection method used at MIMO detecting section 116.

Here, the value of SINR gain $G_{c,j}$ depends on not only H but also the MIMO detection method used at MIMO detecting section 116. For example, when MIMO detecting section 116 uses the ZF detection method, signal-to-interference and noise ratio (SINR) gain $G_{c,j}$ after MIMO detection becomes $G_{c,j}=1/[(Hc)^*H^c]_{jj}^{-1}$ for data substream $s_{c,j}$ for which the c-th subcarrier signal is transmitted through j-th transmitting antenna 108-j. Here, $H^c$ is a channel estimation matrix on the c-th subcarrier in MIMO-OFDM-AMC system 100.

Next, in step S603, transmission bit/transmission power distribution optimizing section 502 optimizes distribution of transmission bits and transmission power in the spatial domain for all data substreams on one subcarrier in the frequency domain, for example, a k-th subcarrier, and obtains $M_k$ and $P_k$. Here, $M_k$ and $P_k$ indicate results of distributing transmission bits and transmission power respectively on the data substreams on the k-th subcarrier. That is, $M_k=\{m_{k,1}, m_{k,2}, \ldots, m_{k,nT}\}$ and $P_k=\{p_{k,1}, p_{k,2}, \ldots, p_{k,nT}\}$.

Here, transmission bit/transmission power distribution optimizing section 502 uses a conventional arbitrary algorithm, for example, Greedy algorithm, used in optimizing transmission bits and transmission power, optimizes adaptive transmission parameters for $n_T$ data substreams on the k-th subcarrier in the frequency domain, and limits the range of optimization to the spatial domain. To be more specific, transmission bit/transmission power distribution optimizing section 502 calculates increments of transmission power $p'_{k,1}, p'_{k,2}, \ldots, p'_{k,nT}$ necessary to improve the AMC parameter by 1 level (equivalent to increasing one transmission bit) for $n_T$ data substreams $s_{k,1}, s_{k,2}, \ldots, s_{k,nT}$ on subcarrier k, compares these $n_T$ numerical values $p'_{k,1}, p'_{k,2}, \ldots, p'_{k,nT}$ that is, carrying out comparison limited in the spatial domain and obtains a minimum value thereof. Transmission bit/transmission power distribution optimizing section 502 increments by 1 the number of transmission bits of the data substream that minimizes the increment of transmission power necessary to improve the AMC parameter by 1 level. That is, transmission bit/transmission power distribution optimizing section 502 actually improves by 1 level the AMC parameter of the data substream that minimizes the increment of transmission power necessary to improve the AMC parameter by 1 level. Transmission bit/transmission power distribution optimizing section 502 distributes all of a predetermined number of transmission bits to $n_T$ data substreams on the k-th subcarrier by repeating the above processing, and obtains $M_k=\{m_{k,1}, m_{k,2}, \ldots m_{k,nT}\}$. Next, transmission bit/transmission power distribution optimizing section 502 obtains $P_k=\{p_{k,1}, p_{k,2}, \ldots, p_{k,nT}\}$ according to $p_{c,j}=S_{BER}(m_{c,j})/G_{c,j}$.

Next, in step S604, transmission bit/transmission power distribution optimizing section 502 adds the k-th subcarrier to set U.

Next, adjacent subcarrier transmission bit/transmission power distribution optimizing section 503 sequentially uses the adaptive transmission parameter information distributed on the k-th subcarrier on which adaptive transmission parameters are distributed, optimizes distribution of transmission bits and transmission power for the adjacent subcarriers and obtains results of distributing transmission bits and transmission power on all data substreams of all subcarriers other than the k-th subcarrier.

To be more specific, in step S605, adjacent subcarrier transmission bit/transmission power distribution optimizing section 503 determines whether or not there is a subcarrier under the following predetermined condition in set U comprised of the subcarriers on which adaptive transmission parameters are distributed. That is, it is determined whether or not transmission bits and transmission power are distributed to a subcarrier adjacent to the subcarrier. When it is determined that there is such a subcarrier, adjacent subcarrier transmission bit/transmission power distribution optimizing section 503 expresses the subcarrier as subcarrier l and expresses the adjacent subcarrier as subcarrier l'.

In step S605, when it is determined that there is no subcarrier under the above predetermined condition, adjacent subcarrier transmission bit/transmission power distribution optimizing section 503 determines that distribution of transmission bits and transmission power is completed on all $N_c$ subcarriers of MIMO-OFDM-AMC system 100 and ends the flow.

In step S605, when it is determined that there is the subcarrier under the above predetermined condition, adjacent subcarrier transmission bit/transmission power distribution optimizing section 503 extracts subcarrier l and subcarrier l'. That is, by using adaptive transmission parameters distributed to subcarrier l to which the adaptive transmission parameters are distributed, adaptive transmission parameters are distributed to adjacent subcarrier l' as follows.

Next, in step S606, adjacent subcarrier transmission bit/transmission power distribution optimizing section 503 sets transmission bit distribution parameter $M_{l'}=\{m_{l,1}, m_{l,2}, \ldots, m_{l,nT}\}$ distributed on subcarrier l to an initial value of the transmission bit distribution parameter $M_l$ distributed on subcarrier l'. That is, in this step (S606), $M_{l'}=M_l$, and, in the processing from step S606 onward, an adjustment will be carried out based on the initial value.

To be more specific, in step S607, adjacent subcarrier transmission bit/transmission power distribution optimizing section 503 carries out comparison to determine on which data substream maximum transmission power can be saved assuming that AMC parameters for all data substreams on subcarrier l' are lowered by 1 level. That is, adjacent subcarrier transmission bit/transmission power distribution optimizing section 503 determines data substream n which can save maximum transmission power according to following equation 1. Next, adjacent subcarrier transmission bit/transmission power distribution optimizing section 503 lowers the AMC parameters for data substream n by 1 level so that $m_{l',n}=m_{l',n}-1$.

$$n = \arg\max_j\{(S_{BER}(m_{l',j})-S_{BER}(m_{l',j}-1))/G_{l',j}\} \quad \text{(Equation 1)}$$

Next, in step S608, adjacent subcarrier transmission bit/transmission power distribution optimizing section 503 carries out comparison to determine on which data substream transmission power to be increased is the smallest assuming that the AMC parameters for all data substreams on subcarrier l' are improved by 1 level. Adjacent subcarrier transmission bit/transmission power distribution optimizing section 503 determines data substream n' which minimizes transmission power to be increased according to following equation 2. Next, adjacent subcarrier transmission bit/transmission power distribution optimizing section 503 improves the AMC parameters for data substream n' by 1 level so that $m_{l',n'}=m_{l',n'}+1$.

$$n' = \arg\min_j\{(S_{BER}(m_{l',j}+1)-S_{BER}(m_{l',j}))/G_{l',j}\} \quad \text{(Equation 2)}$$

Next, in step S609, adjacent subcarrier transmission bit/transmission power distribution optimizing section 503 compares n with n'.

In step S609, when it is determined that n is not equal to n', adjacent subcarrier transmission bit/transmission power distribution optimizing section 503 returns to step S607 and determines data substream n again, then determines data substream n' again in step S608 and continues to adjust transmission bit distribution parameter $M_{l'}$. Here, data substream n and data substream n' determined in step S607 and step S608 in this case are different from data substream n and data substream n' previously determined in step S607 and step S608.

In step S609, when it is determined that n is equal to n', adjacent subcarrier transmission bit/transmission power distribution optimizing section 503 determines that it is not necessary to continue to adjust transmission bit distribution parameter $M_{l'}$ on subcarrier l', and the flow shifts to step S610.

Next, in step S610, adjacent subcarrier transmission bit/transmission power distribution optimizing section 503 ends adjustment of transmission bit distribution parameter $M_{l'}$ on subcarrier l', and adds subcarrier l' to set U, and the flow returns to step S605.

When MIMO-OFDM-AMC system 100 completes distribution of the number of bits to be transmitted on all $N_c \times n_T$ data substreams, $m_{c,j}$'s with the number of $N_c \times n_T$ are obtained, where c=1, 2, ..., $N_c$ and j=1, 2, ..., $n_T$. Next, transmission power distribution parameters of $N_c \times n_T$ data streams are calculated according to equation $p_{c,j} = S_{BER}(m_{c,j})/G_{c,j}$.

In this way, the transmission bit distribution parameters and the transmission power distribution parameters can be obtained.

In this way, MIMO-OFDM-AMC system 100 according to the present invention carries out distribution of transmission bits and transmission power in the spatial domain, then uses the result of distributing transmission bits and transmission power and the correlation of channel characteristics on the subcarriers in the spatial domain and distributes transmission bits and transmission power on subcarriers in the frequency domain.

What is clear in theoretical studies on the channel capacity of a multi-antenna radio communication system is that loss of the channel capacity in adaptive transmission when adaptive distribution is simply carried out in the spatial domain is much smaller than when combined distribution is carried out in the frequency domain and in the spatial domain. In other words, even if the method of carrying out combined optimization in the frequency domain and spatial domain in distribution of transmission bits and transmission power is changed to the method of simply carrying out distribution of transmission bits and transmission power in the spatial domain, significant loss does not occur in system performance. Moreover, the amount of calculation in processing of the distribution in the spatial domain is much smaller than the combined optimization in the frequency domain and spatial domain. MIMO-OFDM-AMC system 100 uses the correlation between channel characteristics of the adjacent subcarriers and can further simplify the algorithm of distribution of transmission bits and transmission power. Thus, the transmission method according to the present invention reduces the amount of calculation in processing by simply carrying out distribution of transmission bits and transmission power in the spatial domain, and carries out distribution of transmission bits and transmission power for all subcarriers in the frequency domain by using the results of distributing transmission bits and transmission power in the spatial domain.

The transmission method according to the present invention does not carry out combined optimization in distribution of transmission bits and transmission power in the frequency domain and in the spatial domain, and simply carries out distribution of transmission bits and transmission power in the spatial domain, so that it is possible to reduce the number of dimensions used for distribution of transmission bits and transmission power and reduce the amount of calculation in processing. Further, it is possible to simplify the algorithm of distribution of transmission bits and transmission power using the correlation between channel characteristics on the adjacent subcarriers.

If the transmission method does not simply carry out optimization in distribution of transmission bits and transmission power in the spatial domain alone, a method of carrying out optimization in the spatial domain and in the frequency domain at the same time may be possible. However, such a method requires an enormous amount of calculation in processing compared to the transmission method of the present invention of simply carrying out distribution of transmission bits and transmission power in the spatial domain alone.

Figure 5:
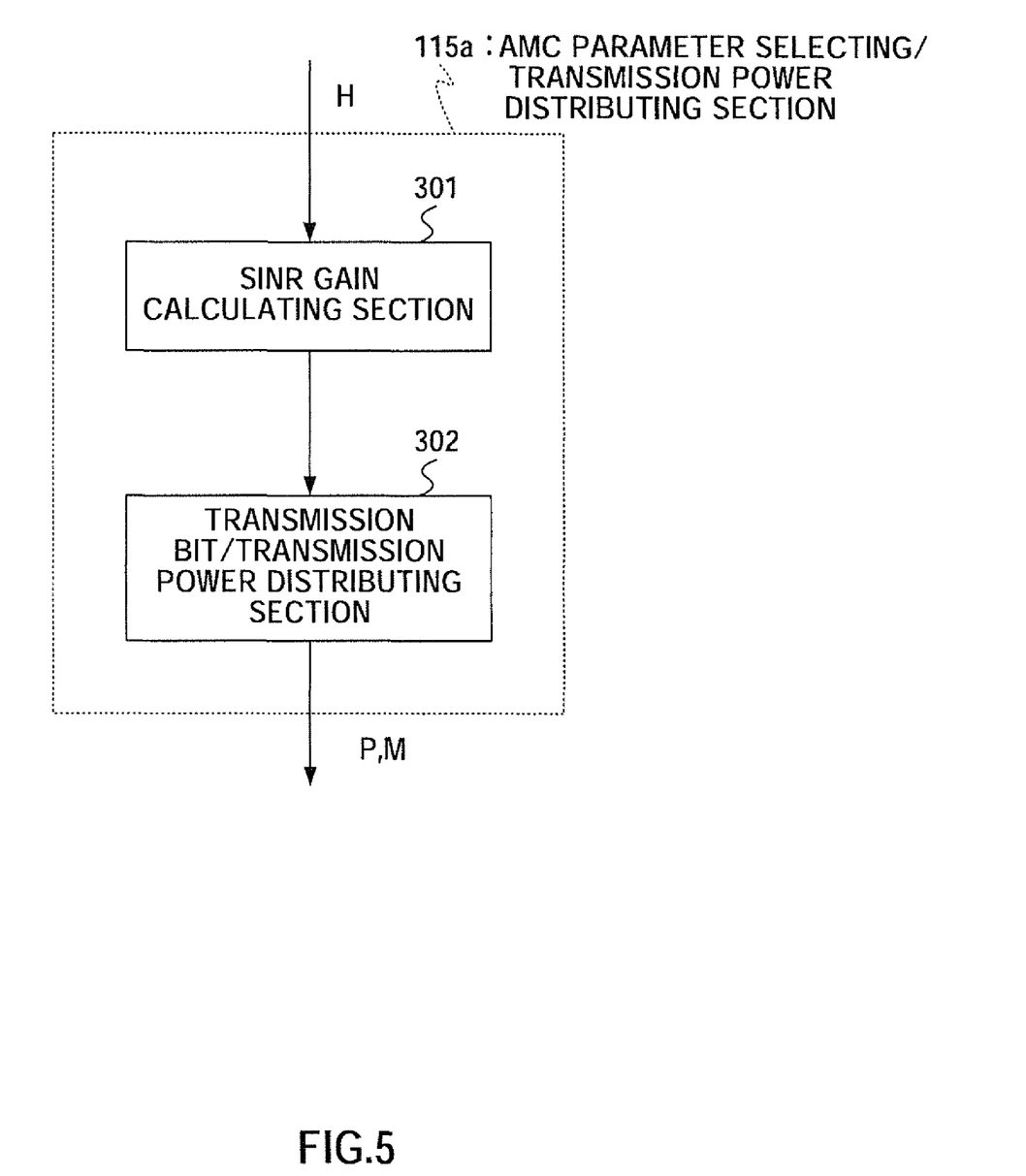
FIG. 5 is a block diagram showing the detailed configuration of the AMC parameter selecting/transmission power distributing section that optimizes distribution of transmission bits and transmission power in both the frequency domain and spatial domain at the same time.

FIG. 5 is a block diagram showing the detailed configuration of AMC parameter selecting/transmission power distributing section 115a that optimizes distribution of transmission bits and transmission power in both the frequency domain and spatial domain at the same time. AMC parameter selecting/transmission power distributing section 115a shown in FIG. 5 differs from AMC parameter selecting/transmission power distributing section 115 shown in FIG. 3 in having transmission bit/transmission power distributing section 302 instead of transmission bit/transmission power distribution optimizing section 502 and adjacent subcarrier transmission bit/transmission power optimizing section 503.

In FIG. 5, AMC parameter selecting/transmission power distributing section 115a has two parts of signal-to-interference and noise ratio (SINR) gain calculating section 301 and transmission bit number/transmission power distributing section 302.

SINR gain calculating section 301 calculates signal-to-interference and noise ratio (SINR) gain $G_{c,j}$ after MIMO detection of data substreams $s_{c,j}$ in the MIMO-OFDM-AMC system using channel estimation matrix H obtained from the channel estimating section. Here, c=1, 2, ... $N_c$ and j=1, 2, ..., $n_T$.

Transmission bit/transmission power distributing section 302 carries out combined optimization in the frequency domain and in the spatial domain on the number of transmission bits $m_{c,j}$ and transmission power $p_{c,j}$ distributed to data substreams $s_{c,j}$ by using $G_{c,j}$ obtained in SINR gain calculating section 301, and outputs transmission bit distribution parameter M and transmission power distribution parameter P. Here, c=1, 2, ..., $N_c$ and j=1, 2, ..., $n_T$. There are many types of optimization algorithm of distributing transmission bits and transmission power used in adaptive transmission. One of famous examples is a Greedy algorithm.

Figure 6:
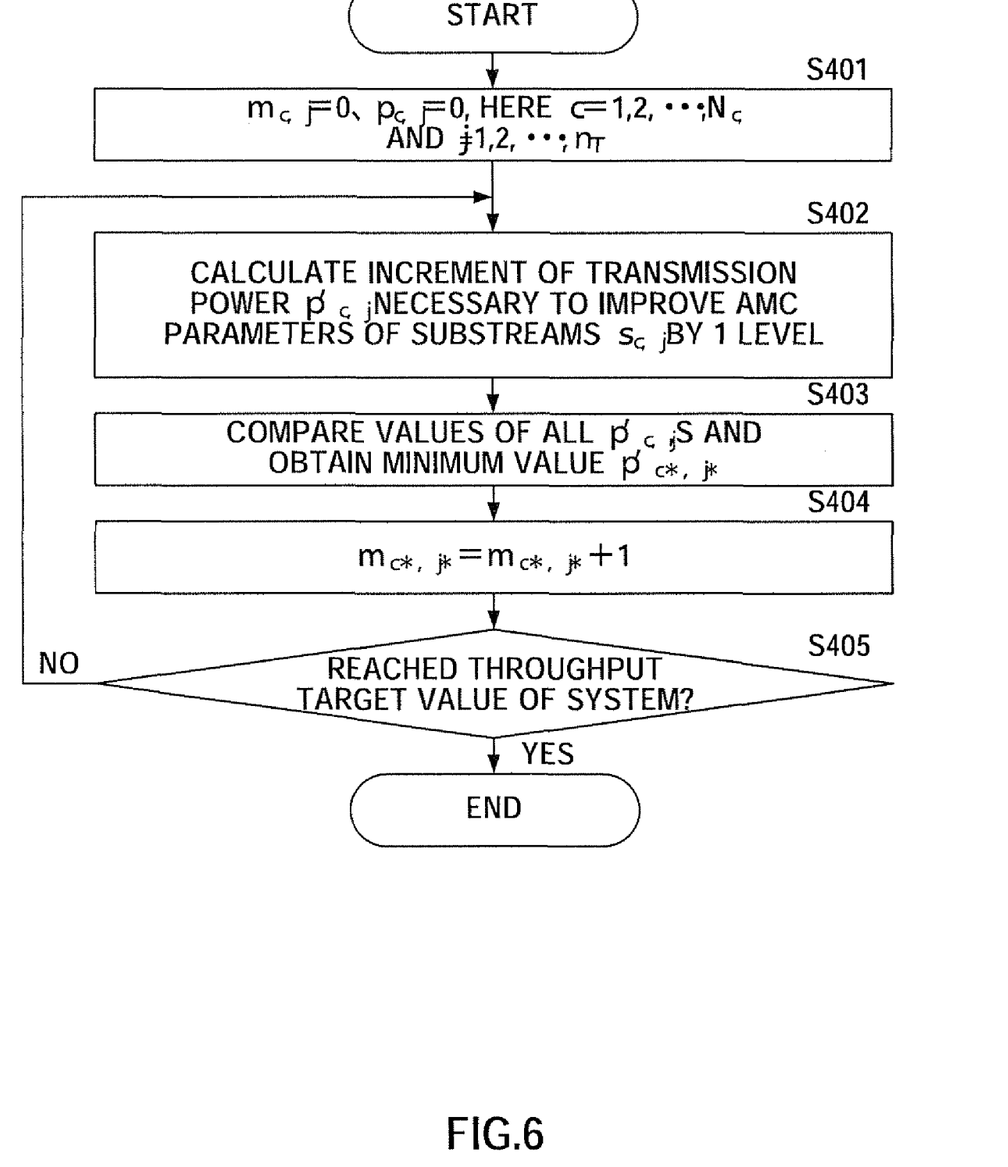
FIG. 6 is a flowchart showing steps of the method of optimizing distribution of transmission bits and transmission power using a Greedy algorithm.

FIG. 6 is a flowchart showing steps of the method of optimizing distribution of transmission bits and transmission power by using the Greedy algorithm in AMC parameter selecting/transmission power distributing section 115a.

First, in step S401, transmission bit/transmission power distributing section 302 initializes both the number of transmission bits $m_{c,j}$ and transmission power $p_{c,j}$ to be distributed to data substreams $s_{c,j}$ to 0. Here, c=1, 2, ..., $N_c$, and j=1, 2, ... $n_T$.

Next, in step S402, transmission bit/transmission power distributing section 302 calculates increment of transmission power $p'_{c,j}$ necessary to improve AMC parameters for $N_c \times n_T$ data substreams $s_{c,j}$ by 1 level. Increment of transmission power $p'_{c,j}$ is calculated according to following equation 3.

$$p'_{c,j} = (S_{BER}(m_{c,j}+1) - S_{BER}(m_{c,j}))/G_{c,j} \qquad \text{(Equation 3)}$$

Here, $S_{BER}(n)$ expresses a threshold value of the reception power required for the radio receiving apparatus to satisfy a predetermined requirement of bit error rate (BER) when the average value of the number of information bits to be transmitted is n. The values Of $S_{BER}(1)$, $S_{BER}(2)$, ... are obtained as initial values of the system by simulations or calculations of the equations.

Next, in step S403, transmission bit/transmission power distributing section 302 compares the values of all $p'_{c,j}$'s and obtains minimum value $p'_{c*,j*}$. That is, when one additional information bit is transmitted using data substream $s_{c*,j*}$ out of all data substreams (which is equivalent to improving AMC parameters by 1 level described in step S402), the necessary increment of transmission power becomes a minimum.

Next, in step S404, transmission bit/transmission power distributing section 302 increments the number of transmission bits to be distributed to data substream $s_{c*,j*}$ by 1 so that $m_{c*,j*}=m_{c*,j*}+1$. Transmitting one additional information bit using data substream $s_{c*,j*}$ is namely equivalent to improving the AMC parameters by 1 level.

Next, in step S405, transmission bit/transmission power distributing section 302, in this case, determines whether or not system throughput reaches a predetermined target value. To be more specific, throughput $R=\Sigma_c\Sigma_j(r_{c,j})$ is compared with target value (overall average throughput value) $R_b$ of the sum total of throughputs corresponding to all data substreams $s_{c,j}$.

In step S405, when it is determined that $R \geq R_b$, transmission bit/transmission power distributing section 302 determines that the system throughput requirement is not satisfied by distribution of transmission bits, the flow returns to step S402 and distribution of transmission bits is continued.

In step S405, when it is determined that $R \geq R_b$, the processing of distributing transmission bits ends. In this case, obtained $m_{c,j}$ values are namely final results of distributing transmission bits (transmission bit distribution parameters) on data substreams $s_{c,j}$. Transmission power distribution parameters $p_{c,j}$ are calculated according to following equation 4.

$$p_{c,j}=S_{BER}(m_{c,j})/G_{c,j} \quad \text{(Equation 4)}$$

As shown in the flow of FIG. 6, AMC parameter selecting/transmission power distributing section 115a carries out combined optimization of the number of transmission bits $m_{c,j}$ and transmission power $p_{c,j}$ distributed to data substreams $s_{c,j}$ in the frequency domain and the spatial domain mainly in step S403. In step S403, transmission bit/transmission power distributing section 302 compares the increment of transmission power necessary to improve AMC parameters by 1 level for all data substreams corresponding to all the subcarriers in the frequency domain and all the transmitting antennas in the spatial domain. In short, every time one bit is distributed according to the algorithm, the above increment of transmission power (or itinerary sum total) of all $N_c \times n_T$ data substreams is compared once.

Obviously, in a MIMO-OFDM-AMC system, the method of carrying out combined optimization in distribution of transmission bits and transmission power in the frequency domain and in the spatial domain enormously increases the amount of calculation in processing compared to the transmission method according to the present invention of simply carrying out optimization in distribution of transmission bits and transmission power in the spatial domain. Further, when throughput target value Rb of the system is higher, the amount of calculation in processing increases enormously.

The transmission method and the transmitting apparatus used for a multi-antenna radio communication system according to the present invention are not limited to the above embodiment, can also be implemented and modified in various ways.

Furthermore, the transmitting apparatus according to the present invention can be provided on a communication terminal apparatus and a base station apparatus in a mobile communication system based on a MIMO-OFDM-AMC scheme, so that it is possible to provide a communication terminal apparatus, base station apparatus and mobile communication system that make it possible to provide the similar advantages as those described above.

Also, in the above embodiments, a case has been described as an example where the present invention is configured by hardware. However, the present invention can also be realized by software. For example, it is possible to implement the same functions as in the base station apparatus of the present invention by describing algorithms of the transmission bit and transmission power distribution apparatus according to the present invention using the programming language, and executing this program with an information processing section by storing in memory.

The present application is based on Chinese Patent Application No. 200510056304.0, filed on Mar. 16, 2005, the entire content of which is expressly incorporated by reference herein.

INDUSTRIAL APPLICABILITY

The transmission method and the transmitting apparatus used for a multi-antenna radio communication system according to the present invention can be applied to adaptive transmission and the like in a MIMO-OFDM system.

The invention claimed is:

1. A transmission method used for a multi-antenna radio communication system, comprising:
    a signal-to-interference and noise ratio gain calculating step of detecting data substreams and calculating a signal-to-interference and noise ratio gain for each data substream;
    a spatial domain distribution step of optimizing distribution of transmission bits and transmission power in a spatial domain for all data substreams on a given subcarrier in a frequency domain based on the obtained signal-to-interference and noise ratio gain, and determining transmission bit and transmission power distribution parameters; and
    an adjacent subcarrier distribution step of optimizing distribution of transmission bits and transmission power for an adjacent subcarrier by sequentially using the transmission bit and transmission power distribution parameters distributed on the given subcarrier for which the transmission bit and transmission power distribution parameters are determined.

2. The transmission method according to claim 1, wherein the spatial domain distribution step optimizes distribution of transmission bits and transmission power in a spatial domain for all data substreams on the given subcarrier in the frequency domain by using a Greedy algorithm.

3. The transmission method according to claim 1, wherein the spatial domain distribution step calculates an increment of transmission power necessary to improve transmission bit distribution parameters by 1 level for data substreams on the given subcarrier, and determines to improve by 1 level the transmission bit distribution parameter of a data substream that minimizes the increment of the transmission power.

4. The transmission method according to claim 1, wherein the spatial domain distribution step calculates an increment of transmission power necessary to increase one transmission bit for each data substream on the given subcarrier, and determines to improve by 1 level the transmission bit distribution parameter of a data substream that minimizes the increment of the transmission power.

5. The transmission method according to claim 3, wherein the spatial domain distribution step calculates an increment of transmission power necessary to improve by 1 level an adaptive modulation and coding parameter, which is a transmission bit distribution parameter, for each data substream on the given subcarrier, and improves by 1 level the adaptive modulation and coding parameter of the data substream that minimizes the increment of the transmission power.

6. The transmission method according to claim 1, wherein the adjacent subcarrier distribution step comprises a determining step of determining whether or not there is a subcarrier for which transmission bits and transmission power are not distributed among subcarriers adjacent to the given subcarrier.

7. The transmission method according to claim 6, further comprising, after the determining step, a using step of using, in distribution of transmission bit and transmission power distribution parameters for a subcarrier adjacent to the given subcarrier, the transmission bit and transmission power distribution parameters distributed to the given subcarrier to which transmission bit and transmission power distribution parameters are distributed.

8. The transmission method according to claim 7, wherein the using step uses the transmission bit distribution parameters distributed to the given subcarrier as initial values of the transmission bit distribution parameters distributed to the adjacent subcarrier.

9. The transmission method according to claim 8, wherein the adjacent subcarrier distribution step further comprises an adjusting step of reducing by 1 level transmission bit distribution parameters of a data substream where maximum transmission power can be saved among all data substreams on the adjacent subcarrier based on the initial values.

10. The transmission method according to claim 9, further comprising, in addition to an adjustment by the adjusting step, a step of improving by 1 level the transmission bit distribution parameters of a data substream that requires a smallest increment of transmission power among all data substreams on the adjacent subcarrier, and obtaining transmission bit distribution parameters.

11. The transmission method according to claim 1, wherein the multi-antenna radio communication system is a multi-antenna input multi-antenna output orthogonal frequency division multiplexing radio communication system.

12. A transmitting apparatus used for a multi-antenna radio communication system, comprising:
 a signal-to-interference and noise ratio gain calculating section that detects data substreams adaptively transmitted, using channel estimation matrix H, and calculates a signal-to-interference and noise ratio gain for each data substream;
 a transmission bit and transmission power distribution optimizing section that optimizes distribution of transmission bits and transmission power in a spatial domain for all data substreams on a given subcarrier in a frequency domain based on the obtained signal-to-interference and noise ratio gain, and determines transmission bit and transmission power distribution parameters; and
 an adjacent subcarrier transmission bit and transmission power optimizing section that optimizes distribution of transmission bits and transmission power for a subcarrier adjacent to the given subcarrier for which the transmission bit and transmission power distribution parameters are determined, by sequentially using the transmission bit and transmission power distribution parameters distributed on the given subcarrier.

13. The transmitting apparatus according to claim 12, wherein the multi-antenna radio communication system is a multi-antenna input multi-antenna output orthogonal frequency division multiplexing radio communication system.

* * * * *